United States Patent [19]

Galligan

[11] Patent Number: 5,410,589
[45] Date of Patent: Apr. 25, 1995

[54] TELEPHONE SYSTEM ADAPTED TO REPORT TO CUSTOMERS TELEPHONE FACILITY TRAFFIC DATA

[75] Inventor: John P. Galligan, Norcross, Ga.

[73] Assignee: BellSouth Corporation, Atlanta, Ga.

[21] Appl. No.: 38,000

[22] Filed: Mar. 25, 1993

[51] Int. Cl.⁶ .................. H04M 15/00; H04M 3/42; H04M 7/00
[52] U.S. Cl. ...................... 379/134; 379/111; 379/113; 379/115; 379/133; 379/135; 379/137; 379/139; 379/207; 379/225
[58] Field of Search .............. 379/111, 113, 115, 116, 379/133, 134, 135, 137, 139, 207, 225

[56] References Cited

U.S. PATENT DOCUMENTS

| | | | |
|---|---|---|---|
| 4,191,860 | 3/1980 | Weber | 379/211 |
| 4,788,718 | 11/1988 | McNabb | 379/134 |
| 5,003,584 | 3/1991 | Benyacar | 379/135 |
| 5,008,929 | 4/1991 | Olsen et al. | 379/115 |
| 5,042,027 | 8/1991 | Takase | 379/133 |
| 5,163,080 | 11/1992 | Amoroso et al. | 379/207 |
| 5,185,780 | 2/1993 | Leggett | 379/139 |
| 5,241,586 | 8/1993 | Wilson et al. | 379/113 |
| 5,247,571 | 9/1993 | Kay et al. | 379/112 |
| 5,260,990 | 11/1993 | MeLampy | 379/225 |

Primary Examiner—Stephen Chin
Assistant Examiner—Vijay Shankar
Attorney, Agent, or Firm—Robin, Blecker, Daley & Driscoll

[57] ABSTRACT

A telephone system adapted to provide preselected customer traffic data to preselected customers having customer facilities. The central office switch of the central office serving the preselected customers is adapted accumulate and identify preselected customer traffic data of customer facilities similarly to company traffic data of company facilities. The customer traffic data is accessed with the company traffic data by an Engineering and Administration Data Acquisition System of the telephone system which is adapted to transmit the preselected customer traffic data to a Network Usage Information Service processor associated with the central office serving the preselected customers. The Network Usage Information Service processor then transmits the received preselected customer traffic data to the corresponding preselected customers over the telephone system.

36 Claims, 1 Drawing Sheet

TELEPHONE SYSTEM ADAPTED TO REPORT TO CUSTOMERS TELEPHONE FACILITY TRAFFIC DATA

BACKGROUND OF THE INVENTION

This invention relates to telephone systems and, in particular, to telephone systems for providing enhanced services to telephone system customers.

In modern day telephone systems, customers of the system may often rent or lease from the telephone system operator or company telephone facilities for use by the customer. The customer may also employ at its location or premises customer provided telephone facilities. The aforesaid leased and customer provided telephone facilities are usually for the exclusive use of the customer and are referred to as herein as customer facilities. The other telephone facilities of the telephone company, which form the predominate part of the telephone system and are used generally for all customers, are referred to herein as company facilities.

Customer facilities may comprise a variety of facility types including trunk lines, multi-line groups, network access registers, single customer lines, customer consoles and any other types of telephone facilities offered by the telephone company or useable in the telephone system. Since the customer facilities of a customer may be extensive, the customer often desires information as to their usage. This so-called "traffic data" can be used by the customer to assess how efficiently its telephone facilities are operating, so that the customer can then determine whether there is a need to reduce, expand or modify the facilities. Traffic data is also used by the customer to assess the grade and level of service that the customer is providing to its clients and end-users.

Various procedures have been employed in the past to provide a customer with traffic data associated with its customer facilities. One procedure is to provide a dedicated line between the customer and the central office serving the customer. The central office switch is then provided with appropriate registers adapted to accumulate preselected traffic data of certain customer facilities as determined by the customer. The accumulated customer traffic data is then communicated over the dedicated line to the customer. Other procedures involve recording the customer traffic data on magnetic tape or on paper which is then delivered from the central office to the customer. In each of these cases, the customer traffic data supplied has been limited to that of customer facilities associated with the single switch of the central office serving the customer.

Since the above procedures involve conveying of customer traffic data from a central office to each customer directly, it is costly for the telephone company to provide. This, in turn, increases the cost of the service to the customer, thereby, limiting the number of customers who can avail themselves of the service.

Another procedure which has been followed in the past by customers to obtain customer traffic data is to request the telephone company to engage in a traffic study of the customer facilities over a limited period of time, usually a week. This study is normally conducted by the telephone company using one of its existing centralized Engineering and Administration Data Acquisition Systems (EADASs) connected to the central office serving the customer requesting the study. A telephone company usually deploys one or more EADASs throughout the region served by its telephone system.

Each EADAS is associated with a group of central offices in the telephone system and periodically (e.g., every 30 minutes) gathers information and traffic data related to the company facilities serving the group of central offices. This information and company traffic data is then used internally by the telephone company for operation of the telephone system.

The various types of electronic central office switches in use today include registers which can be specifically assigned to accumulate the traffic data associated with the telephone facilities serving the switches. This traffic data is identified by each switch in terms of so-called "Sections" each corresponding to a predetermined or preselected traffic data category. Each specific Section has a Section Number and Keyword for identifying and accessing the traffic data files of the associated traffic data category.

When a traffic study is requested by a customer, telephone company personnel assign registers in the central office switch serving the customer to accumulate the desired traffic data of the customer facilities in the same manner as registers are assigned to accumulate the company traffic data. The customer traffic data is also identified in the same manner as the company traffic data under the appropriate Section Number and Keyword file and is sent to the EADAS. At the EADAS, the customer traffic data for the period requested is then assimilated and retrieved from the received traffic data files and a report prepared to communicate the results of the study to the customer.

As can be appreciated, while the above procedure of requesting a traffic study can be worthwhile for a customer, it can also be costly, since it requires a specific request and a specific study to be made by the telephone company. Additionally, the study is confined to a specific time period and does not allow customers to receive directed, on-line traffic data at their premises.

It is, therefore, an object of the present invention to provide a telephone system in which customer traffic data is made more readily and easily available to a customer.

It is a further object of the present invention to provide a telephone system in which customer traffic data is made available to a customer in an efficient manner using to the extent possible existing components of the telephone system.

It is yet a further object of the present invention to provide a telephone system in which customer traffic data is made available to a customer from a plurality of different types of central office switches, with a common output specification.

SUMMARY OF THE INVENTION

In accordance with the principles of present invention the above and other objectives are realized in a telephone system of the above-type in which each central office switch of a central office serving preselected customers (i.e., customers having customer facilities and subscribing to the customer traffic data service of the telephone system) is adapted to assign certain of its registers to accumulating preselected customer traffic data (i.e., traffic data of customer facilities designated by the preselected customers) and to make this customer traffic data available to the EADAS serving the switch. The preselected customer traffic data of a particular traffic data category is made available to the EADAS in the same manner and form and based on the same traffic data categories as the company traffic data. Furthermore, it is stored in the EADAS under the associated traffic data category on a switch-by-switch basis.

The EADAS is additionally adapted to periodically assimilate and transmit its traffic data files containing the preselected customer traffic data of each particular switch to a Network Usage Information Service (NUIS) processor associated with the particular central office served by that switch. The EADAS transmits these traffic data files based on the traffic data categories included in the preselected customer traffic data. As a result, both the latter traffic data and any company traffic data of the same category is also transmitted.

The NUIS processor is adapted to process the received traffic data files by discarding all but the preselected customer traffic data of the preselected customers, which it segments and stores on a customer-by-customer basis. The NUIS processor is further adapted to periodically communicate its stored preselected customer traffic data to the respective preselected customers in standard fashion over the telephone system, i.e., via conventional dial-out or private line arrangements of the telephone system serving the NUIS processor.

The NUIS processor used with the invention can employ similar programming, modified for traffic data, as that used in the so-called "Basic Communication Package" (BCP) presently employed for processing call records in Station Message Detail Recording (SMDR) systems. Additionally, the NUIS processor function can be incorporated into existing computers used in such SMDR systems.

BRIEF DESCRIPTION OF THE DRAWINGS

The above and other features and aspects of the present invention will become more apparent upon reading the following detail description in conjunction with the accompanying drawings, in which.

DETAILED DESCRIPTION

Figure 1:
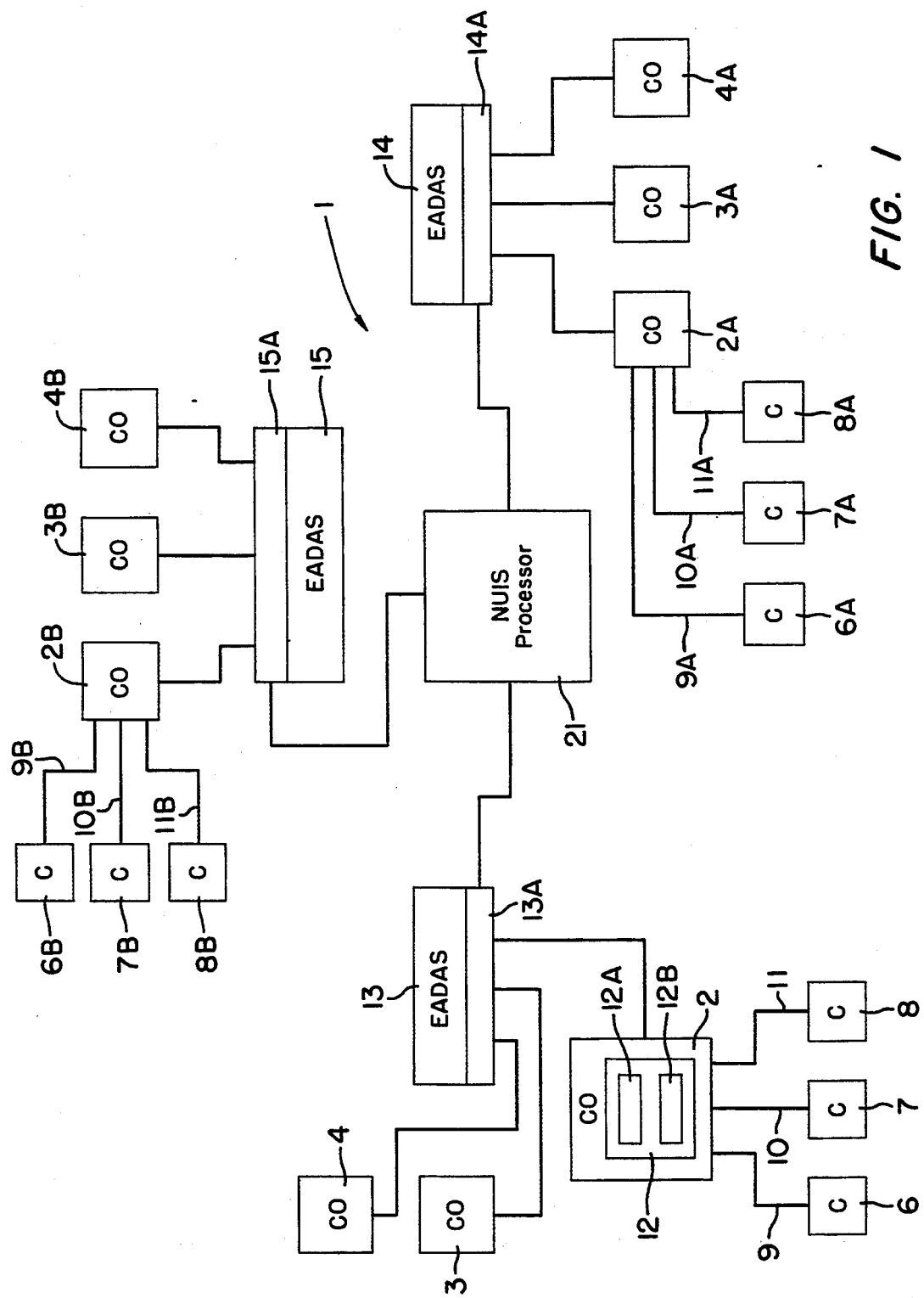
FIG. 1 shows a telephone system adapted in accordance with the principles of the present invention.

FIG. 1 shows a telephone system 1 in accordance with the principles of the present invention. As shown, the system 1 includes groups of central offices (2, 3, 4), (2A, 3A, 4A) and (2B, 3B, 4B). Each central office communicates with its respective customers over telephone facilities, which may be company and/or customer facilities, and each of which may include one or more of the following facility elements: trunks (including intermachine trunks, private trunks, tie lines, etc.), multi-line hunt groups, network access registers and customer premises equipment including customer consoles and customer lines.

To simplify FIG. 1, only the customers 6, 7, 8 served by the central office switch 2, the customers 6A, 7A, 8A served by the central office switch 2A and the customers 6B, 7B, 8B served by the central office switch 2B are specifically shown. These customers are connected to respective telephone facilities (9, 10, 11), (9A, 10A, 11A) and (9B, 10B, 11B) to their respective central offices. For the purposes of discussion, the facilities 9 and 9A are assumed to be customer facilities and the remaining facilities 10, 11, 10A, 11A, 9B, 10B and 11B are assumed to be company facilities.

Each of the central offices of the system 1 includes a central office switch for routing calls to and from the customers served by the central office. The switch used in each central office can be any one of the conventional program driven electronic switches available today. Typical switch types might be the DMS-100, manufactured by Northern Telecom or the 1AESS or 5ESS, manufactured by AT&T. In FIG. 1 only the switch 12 of the central office 2 is actually shown.

Each of the switches of the central offices includes registers assigned to accumulate traffic data associated with the company facilities connected to its respective central office. Thus, as shown, the switch 12 includes company traffic data registers 12A for collecting selected company traffic data from the company facilities 10 and 11 connecting the switch 2 to the customers 7 and 8.

The selected company traffic data collected by each company traffic data register depends on the switch type, the elements in the particular facility and the categories of traffic data desired to be collected by the company. Each switch accumulates and identifies the traffic data in terms of Section Numbers and associated Keywords. Each Section Number and associated Keyword, in turn, correspond to a given or particular traffic data category. A full description of the traffic data categories, Section Numbers and Keywords for the conventional electronic switches discussed above, i.e., the DMS-100, 1AESS and 5ESS, is provided in the following publications, the teachings of which are incorporated herein by reference: DMS-100 Family EADAS Interface Administration Guide, Northern Telecom, Publication No. 297-1001-335, October 1991; Traffic Measurements—Hourly Schedules Network Administration No. 1/1A Electronic Switching Systems, Bell System Practices, Section 231-070-515, Issue 2, March 1979; 5ESS ® Switch Administration and Engineering Guidelines 5E2 through 5E7 Software Releases Volume 1, AT&T, 235-070-100, Issue 601, April 1992.

The traffic data files developed by the central office switches of the system 1 are accessed periodically (typically, every 30 minutes) in standard fashion by respective EADASs included in the telephone system 1. In FIG. 1, the EADASs 13, and 15 access the company traffic data files from the groups of central offices (2, 3, 4), (2A, 3A, 4A) and (2B, 3B, 4B), respectively.

The EADASs 13, 14 and 15 store and process the company traffic data files received from their respective central office switches in so-called "front-end computers", shown as computers 13A, 14A and 15A. This occurs on a switch-by-switch basis and the basis of the traffic data categories (i.e., the Section Numbers and Keywords) used to identify the data. The stored company traffic data is then used by each EADAS directly for engineering and administration purposes of the telephone system 1. It is also passed on by each EADAS to other parts of the telephone system for management and central control of the switching hierarchy of the system.

In accordance with the principles of the present invention the system 1 is further adapted to permit preselected customers (i.e., customers having customer facilities and who have subscribed to the customer traffic data service of the system 1) to be provided with preselected customer traffic data (i.e., categories of customer traffic data determined by the customer). More particularly, this is accomplished in the system 1 by further adapting the central office switches of the central offices serving the preselected customers to assign certain of their registers to accumulating the preselected customer traffic data from the customer facilities of the preselected customers.

In the system of FIG. 1, the customer 6 is assumed to be a preselected customer who has subscribed to the customer traffic data service of the system 1. Accordingly, the switch 12 of the central office 2 has its registers 12B assigned to customer traffic data to accumulate the preselected traffic data from the customer facilities 9 of the customer 6.

In further accord with the invention, each of the central office switches identifies and transmits the accumulated preselected customer traffic data to its associated EADAS in a like manner as the accumulated company traffic data is identified and transmitted. Thus, the preselected customer traffic data is identified with the same categories of traffic data, i.e., Section Numbers and associated Keywords, used for the company traffic data and is transmitted to the associated EADASs with this identification. At each EADAS, the received customer traffic data files are stored similarly to the company traffic data files on a switch-by-switch basis in terms of their respective traffic data categories.

In order to make the stored preselected customer traffic data in each EADAS available to the respective preselected customers, the front-end computer of each EADAS is further adapted to retrieve the stored traffic data files by Sections or Keywords containing this data on a switch-by-switch basis and transmit the files to an NUIS processor associated with the central office of each particular switch. In FIG. 1, each central office is associated with a common NUIS processor 21 so that each of the EADASs 13, 14, 15 transmits its files to this NUIS processor.

This transmission is carried out by each EADAS via its front-end computer and on a traffic data category basis so that the preselected customer traffic data is accompanied by any company traffic data which is of the same traffic data category. The NUIS processor 21, in turn, is adapted to discard all traffic data received from the EADASs 13, 14, 15 which is other than the preselected traffic data of the preselected customers. Thus, the NUIS processor 21 screens the incoming traffic data files from the EADASs, based on its knowledge of the preselected traffic data categories and the preselected customers, which have been previously set in the NUIS processor by the administrator of the system 1. This screening results in all of the company traffic data files being discarded and only the preselected traffic data files of the preselected customers being retained. The retained data is then stored by the NUIS processor 21 on a customer-by-customer basis so that it can be readily accessed by the NUIS processor for transmission to the preselected customers.

To this end, the NUIS processor 21 is further adapted to be able to communicate the stored preselected customer traffic data to the preselected customers. This communication can be accomplished in a number of conventional ways. One way is for the NUIS processor 21 to utilize a dial-out arrangement in which it simply dials the preselected customer's number over the direct distance dial (DDD) network of the system 1 and communicates the preselected customer data over this network. In this type of arrangement, the NUIS processor 21 would be provided with a modem for dialing a preselected customer. The NUIS processor would then carry out a handshake procedure with the customer premises equipment (CPE) of the dialed preselected customer. Finally, the NUIS processor would download the preselected customer traffic data files to the CPE of the dialed preselected customer.

A second way in which the NUIS processor 21 might communicate the preselected customer traffic data to a preselected customer is by a private line arrangement. In this type of arrangement, the NUIS processor 21 would communicate over the corporate packet switched network of the system 1. Using this network, the preselected customer traffic data would be transmitted by the NUIS processor to a packet switched node of the packet switched network in a central office closest to the preselected customer. A private line from the preselected customer to the packet switched node would then carry the preselected customer traffic data to the preselected customer.

The operation of the EADASs 13, 14 and 15 in delivering the preselected customer traffic data to the NUIS processor 21 and the operation of the NUIS processor 21 in delivering the preselected customer data to each preselected customer can be based upon the normal periodic schedule (usually every 30 minutes, as above-described) of the EADASs in accessing the central offices. Thus, a similar periodic schedule of approximately 30 minutes can be set for data transmission from the EADASs to the NUIS processor 21 and from the NUIS processor 21 to the preselected customers.

As can be appreciated, with the system 1 designed as aforesaid, the preselected customers of the system 1 can now have customer traffic data being delivered on an automatic, periodic basis without any additional effort on the part of the customer. Additionally, this has been achieved using the existing EADASs and the existing central office to EADAS links.

It should be noted that the NUIS processor 21 can be implemented in the form of a computer programmed to carry out the above-described functions. Moreover, the programming for the NUIS processor can be similar to the Basic Communication Package (BCP) being sold by AT&T, modified for traffic data, and used with the current Station Message Detail Recording (SMDR) systems. Additionally, the NUIS processor function can be incorporated into existing computers used in such SMDR systems.

Pages 1-3 of Appendix A, attached hereto and made part hereof, describe representative types of traffic data categories that can be preselected by preselected customers of the telephone system 1. The traffic data categories in AppendixA are described for the three types of conventional electronic switches mentioned above, i.e., the DMS-100, 1AESS and 5ESS, respectively, and are based on the Section Numbers and Keywords used by these switches for the specified traffic data categories In all cases, it is understood that the above-described arrangements are merely illustrative of the many possible specific embodiments which represent applications of the present invention. Numerous and varied other arrangements can be readily devised in accordance with the principals of the present invention without departing from the spirit and scope of the invention.

| Appendix A | |
|---|---|
| ELEMENTS OF TRAFFIC DATA | |
| DMS-100: | |
| Sec 96 | MLHG's |
| Sec 112 | Trunk Group Measurements |
| Sec 120 | VFG's |
| Sec 89 | UCD's |
| Sec 49 | IBN Subgroup |

Appendix A (continued)

Sec 100    Subscribed Line Orig PC, Term PC and Usage

ELEMENTS OF TRAFFIC DATA

1AESS:
"H" Schedule Measurements:

| TMC | EGO | |
|---|---|---|
| TMC 0 | TGN | Trunk Grp Usage |
| TMC 1 | TGN | Trunk Grp Peg Count |
| TMC 2 | TGN | Trunk Grp Overflow |
| TMC 3 | TGN | Incoming Trunk Grp PC |
| TMC 4 | TGN | Outgoing Trunk Grp PC |
| TMC 6 | TGN | Trunks Mtce Busy |
| TMC 16 | MLHG | MLHG PC |
| TMC 17 | MLHG | MLHG OvFlw |
| TMC 18 | MLHG | MLHG Usage |
| TMC 27 | SFGN | SFG Usage |
| TMC 28 | SFGN | 1-way SFG Outgoing PC |
| TMC 29 | SFGN | 2-way SFG Outgoing PC |
| TMC 30 | SFGN | 2-way SFG Incoming PC |
| TMC 31 | SFGN | SFG Overflow |
| TMC 7 | CTXN | Centrex (CTX) attendant |
| TMC 19 | CTXN | CTX Originating calls |
| TMC 20 | CTXN | CTX Inc calls to LDN |
| TMC 21 | CTXN | CTX Ext Dial "0" (attendt) |
| TMC 24 | CTXN | CTX Attendant Queue Usage |
| TMC 25 | CTXN | CTX Attendant Queue PC |
| TMC 26 | CTXN | CTX Attendant Queue Ofl |
| TMC 44 | CTXN | CTX DID calls |
| TMC 45 | CTXN | CTX dial 8 calls |
| TMC 46 | CTXN | CTX dial 9 calls |
| TMC 1 | LPN | Attendant loop PC |
| TMC 2 | LPN | Attendant loop Ofl |
| TMC 6 | LPN | Attendant loop Mtce |
| TMC 15 | DN | Subscriber Line Busy (1) |

"W" Schedule Measurements:
Subscriber Line Usage    (1)

5ESS:

| Sec 12 | Trunk Group Measurements |
|---|---|
| Sec 32 | SFG's |
| bec 34 | MLHG's |
| Sec 30 | Terminal Grp Measurements |
| Sec 33 | Attendant Grp Measurements |
| Sec 40 | MLHG Queue Measurements |
| Sec 42 | MLHG Queue Announcement |
| Sec 57 | SFG Queue Measurements |
| Sec 58 | SFG Queue Announcements |
| Sec 90 | Subscriber Line Usage |
| Sec 128 | Subscriber Line Peg and Ovfl |

Note: (1) Subscribed Line Busy data from the "H" schedule and Subscribed Line Usage from the "W" schedule will need to be grouped together.

What is claimed is:

1. A telephone system of a telephone company for providing telephone service to customers, one or more of said customers being a preselected customer and the remaining of said one or more customers being non-preselected customers, each preselected customer having customer facilities and subscribing to a customer traffic data service of the telephone system in which preselected customer traffic data is to be made available to the preselected customer, the system comprising:
   for each non-preselected customer, company facilities associated with that non-preselected customer for connecting that non-preselected customer to a central office serving that non-preselected customer;
   for each preselected customer, customer facilities associated with that preselected customer for connecting that preselected customer to a central office serving that preselected customer;
   one or more central offices each serving particular ones of said preselected and non-preselected customers, at least one of said central offices serving a preselected customer and at least one of said central offices serving a non-preselected customer, each central office including a central office switch for routing telephone calls to and from the particular ones of said preselected and non-preselected customers served by that central office;
   each central office switch which serves a non-preselected customer, accumulating company traffic data associated with the company facilities connecting the central office of the central office switch to that non-preselected customer;
   each central office switch which serves a preselected customer, accumulating preselected customer traffic data associated with the customer facilities connecting the central office of that central office switch to that preselected customer;
   an Engineering and Administration Data Acquisition System serving said one or more central offices for receiving and storing the company and preselected customer traffic data accumulated by the central office switches of said one or more central offices, said Engineering and Administration Data Acquisition System further including means for assembling and transmitting to a Network Usage Information Service processor said preselected customer traffic data received by said Engineering and Administration Data Acquisition System;
   and a Network Usage Information Service processor for receiving said transmitted preselected customer traffic data and for enabling the preselected customer traffic data associated with each preselected customer to be made available to that preselected customer.

2. A telephone system in accordance with claim 1 wherein:
   said Engineering and Administration Data Acquisition System stores said company and preselected customer traffic data on a central office switch-by-central office switch basis;
   and said means for assembling and transmitting said preselected customer traffic data does so on central office switch-by-central office switch basis.

3. A telephone system in accordance with claim 2 wherein:
   each of said central office switches accumulates and identifies any preselected customer traffic data and company traffic data on the basis of the same traffic data categories
   said Engineering and Administration Data Acquisition System receives and stores the preselected customer and company traffic data accumulated by said central office switches on the basis of said traffic data categories;
   said means for assembling and transmitting said preselected customer traffic data, assembles and transmits said preselected customer traffic data by assembling and transmitting the customer traffic data and the company traffic data having the traffic data categories included in said preselected customer traffic data;
   and said Network Usage Information Service processor receives said transmitted customer traffic data and company traffic data and screens out all traffic data which is other than the preselected customer traffic data.

4. A telephone system in accordance with claim 3 wherein:
   said Network Usage Information Service processor makes said preselected customer traffic data associated with a particular preselected customer available over said telephone system.

5. A telephone system in accordance with claim 4 wherein:

said Network Usage Information Service processor makes said preselected customer traffic data associated with a particular preselected customer available over said telephone system via one of a conventional dial-out arrangement and a conventional private line arrangement of said telephone system.

6. A telephone system in accordance with claim 4 wherein:

said Network Usage Information Service processor is adapted to also make available to a preselected customer station message detail records.

7. A telephone system in accordance with claim 6 wherein:

said Network Usage Information Service processor includes a basic communication package for making available to a preselected customer said station message detail records;

and said basic communication package is modified to enable said Network Usage Information Service processor to make said preselected customer traffic data available to said preselected customers.

8. A telephone system in accordance with claim 6 wherein:

each of said customer facilities and each of said company facilities includes one or more of the following facility elements: trunks, multi-line hunt groups, network access registers, customer consoles and customer lines.

9. A telephone system in accordance with claim 8 wherein:

each of said central office switches comprises one of a DMS-100, 1AESS, 5ESS electronic switch.

10. A telephone system in accordance with claim 1 wherein:

said Network Usage Information Service processor makes said preselected customer traffic data associated with a particular preselected customer available over said telephone system.

11. A telephone system in accordance with claim 10 wherein:

said Network Usage Information Service processor makes said preselected customer traffic data associated with a particular preselected customer available over said telephone system via one of a conventional dial-out arrangement and a conventional private line arrangement of said telephone system.

12. A telephone system in accordance with claim 1 wherein: said Network Usage Information Service processor is adapted to also make available to a preselected customer station message detail records.

13. A telephone system in accordance with claim 12 wherein:

said Network Usage Information Service processor includes a basic communication package for making available to a preselected customer said station message detail records;

and said basic communication package is modified to enable said Network Usage Information Service processor to make said preselected customer traffic data available to said preselected customers.

14. A telephone system in accordance with claim 1 wherein:

each of said customer facilities and each of said company facilities includes one or more of the following facility elements: trunks, multi-line hunt groups, network access registers, customer consoles and customer lines.

15. A telephone system in accordance with claim 1 wherein:

each of said central office switches comprises one of a DMS-100, 1AESS and 5ESS electronic switch.

16. A telephone system in accordance with claim 1 wherein:

said Network Usage Information Service processor makes said preselected customer traffic data available to said preselected customers automatically on a periodic basis.

17. A telephone system in accordance with claim 16 wherein:

each central office switch accumulates its respective customer traffic data and company traffic data automatically on a periodic basis;

and said means for assembling and transmitting assembles and transmits automatically on a periodic basis.

18. A method of providing telephone service to customers of a telephone system of a telephone company, one or more of said customers being a preselected customer and the remaining of said one or more customers being non-preselected customers, each preselected customer having customer facilities and subscribing to a customer traffic data service of the telephone system which allows preselected customer traffic data to be made available to the preselected customer, the method comprising:

for each non-preselected customer, connecting that non-preselected customer to a central office serving that non-preselected customer using company facilities associated with that non-preselected customer;

for each preselected customer, connecting that preselected customer to a central office serving that preselected customer using customer facilities associated with that preselected customer;

serving particular ones of said preselected and non-preselected customers with one or more central offices, said serving including serving a preselected customer with at least one of said central offices and serving a customer other than a preselected customer with at least one of said central offices, each central office including a central office switch for performing said serving by routing telephone calls to and from the particular ones of said preselected and non-preselected customers served by that central office;

with each central office switch which serves a non-preselected customer, accumulating company traffic data associated with the company facilities connecting the central office of the central office switch to that non-preselected customer;

with each central office switch which serves a preselected customer, accumulating preselected customer traffic data associated with the company facilities connecting the central office of that central office switch to that preselected customer;

receiving and storing the company and preselected customer traffic data accumulated by the central office switches of said one or more central offices using an Engineering and Administration Data Acquisition System;

assembling and transmitting to a Network Usage Information Service processor said preselected customer traffic data received and stored using said Engineering and Administration Data Acquisition System;

and receiving said transmitted preselected customer traffic data and enabling the preselected customer traffic data associated with each preselected customer to be made available to that preselected customer using a Network Usage Information Service processor.

19. A method in accordance with claim 18 wherein: said storing of said company and preselected customer traffic data using said Engineering and Administration Data Acquisition System is on a central office switch-by-central office switch basis;

and said assembling and transmitting of said preselected customer traffic data is on central office switch-by-central office switch basis.

20. A method in accordance with claim 19 wherein: said accumulating and identifying any preselected customer traffic data and company traffic data using a central office switch is on the basis of the same traffic data categories;

said receiving and storing using said Engineering and Administration Data Acquisition System the preselected customer and company traffic data accumulated using said central office switches is on the basis of said traffic data categories;

said assembling and transmitting said preselected customer traffic data includes assembling and transmitting the customer traffic data and the company traffic data having the traffic data categories included in said preselected customer traffic data;

and said receiving said transmitted customer traffic data and said company traffic data using said Network Usage Information Service processor includes screening out all traffic data which is other than the preselected customer traffic data.

21. A method in accordance with claim 20 wherein: said preselected customer traffic data associated with a particular preselected customer is made available by using said Network Usage Information Service processor over said telephone system.

22. A method in accordance with claim 21 wherein: said preselected customer traffic data associated with a particular preselected customer is made available by using said Network Usage Information Service processor over said telephone system via one of a conventional dial-out arrangement and a conventional private line arrangement of said telephone system.

23. A method in accordance with claim 21 further comprising:

making available to a preselected customer station message detail records using said Network Usage Information Service processor.

24. A method in accordance with claim 23 wherein: said making available to a preselected customer said station message detail records using said Network Usage Information Service processor includes using a basic communication package;

and said basic communication package is modified enable said preselected customer traffic data to be made available to said preselected customers using said Network Usage Information Service processor.

25. A method in accordance with claim 23 wherein: each of said customer facilities and each of said company facilities includes one or more of the following facility elements: trunks, multi-line hunt groups, network access registers, customer consoles and customer lines.

26. A method in accordance with claim 25 wherein: each of said central office switches comprises one of a DMS-100, 1AESS and 5ESS electronic switch.

27. A method in accordance with claim 18 wherein: said preselected customer traffic data associated with a particular preselected customer is made available by using said Network Usage Information Service processor over said telephone system.

28. A method in accordance with claim 27 wherein: said preselected customer traffic data associated with a particular preselected customer is made available by using said Network Usage Information Service processor over said telephone system via one of a conventional dial-out arrangement and a conventional private line arrangement of said telephone system.

29. A method in accordance with claim 28 further comprising:

making available to a preselected customer station message detail records using said Network Usage Information Service processor.

30. A method in accordance with claim 29 wherein: said making available to a preselected customer said station message detail records using said Network Usage Information Service processor includes using a basic communication package;

and said basic communication package is modified to enable said preselected customer traffic data to be made available to said preselected customers using said Network Usage Information Service processor.

31. A method in accordance with claim 18 wherein: each of said customer facilities and each of said company facilities includes one or more of the following facility elements: trunks, multi-line hunt groups, network access registers, customer consoles and customer lines.

32. A method in accordance with claim 18 wherein: each of said central office switches comprises one of a DMS-100, 1AESS and 5ESS electronic switch.

33. A method in accordance with claim 18 wherein: said preselected customer traffic data is made available using said Network Usage Information Service processor automatically on a periodic basis.

34. A method in accordance with claim 33 wherein: said accumulation of said customer traffic data and said company traffic data using each central office switch occurs automatically on a periodic basis;

and said assembling and transmitting using said Engineering and Administration Data Acquisition System occurs automatically on a periodic basis.

35. An Engineering and Administration Data Acquisition System for use in a telephone system of a telephone company, the telephone system providing telephone service to customers, one or more of said customers being a preselected customer and the remaining of said one or more customers being non-preselected customers, each preselected customer having customer facilities and subscribing to a customer traffic data service of the telephone system in which preselected customer traffic data is to be made available to the preselected customer, the telephone system comprising: for each non-preselected customer, company facilities associated with that non-preselected customer for connecting that customer to a central office serving that customer; for each preselected customer, customer facilities associated with that preselected customer for connecting that preselected customer to a central office serving that preselected customer; one or more central offices each serving particular ones of said preselected and non-preselected customers, at least one of said central offices serving a preselected customer and at least one of said central offices serving a non-preselected customer, each central office including a central office switch for routing telephone calls to and from the particular ones of said preselected and non-preselected customers served by that central office; each central office switch which serves a non-preselected customer, accumulating company traffic data associated with the company facilities connecting the central office of the central office switch to that non-preselected customer; each central office switch which serves a preselected customer, accumulating preselected customer traffic data associated with the company facilities connecting the central office of that central office switch to that preselected customer; and a Network Usage Information Service processor for receiving preselected customer traffic data and for enabling the preselected customer traffic data associated with each preselected customer to be made available to that preselected customer; said Engineering and Administration Data Acquisition System serving said one or more central offices and comprising:

means for receiving and storing the company and preselected customer traffic data accumulated by the central office switches of said one or more central offices;

and means for assembling and transmitting to a Network Usage Information Service processor said preselected customer traffic data received by said Engineering and Administration Data Acquisition System.

36. A Network Usage Information Service processor for use in a telephone system of a telephone company, the telephone system providing telephone service to customers, one or more of said customers being a preselected customer and the remaining of said one or more customers being non-preselected customers, each preselected customer having customer facilities and subscribing to a customer traffic data service of the telephone system in which preselected customer traffic data is to be made available to the preselected customer, the telephone system comprising: for each non-preselected customer, company facilities associated with that non-preselected customer for connecting that non-preselected customer to a central office serving that non-preselected customer; for each preselected customer, customer facilities associated with that preselected customer for connecting that preselected customer to a central office serving that preselected customer; one or more central offices each serving particular ones of said preselected and non-preselected customers, at least one of said central offices serving a preselected customer and at least one of said central offices serving a non-preselected customer, each central office including a central office switch for routing telephone calls to and from the particular ones of said preselected and non-preselected customers served by that central office; each central office switch which serves a non-preselected customer, accumulating company traffic data associated with the company facilities connecting the central office of the central office switch to that non-preselected customer; each central office switch which serves a preselected customer, accumulating preselected customer traffic data associated with the company facilities connecting the central office of that central office switch to that preselected customer; and an Engineering and Administration Data Acquisition System serving said one or more central offices for receiving and storing the company and preselected customer traffic data accumulated by the central office switches of said one or more central offices, said Engineering and Administration Data Acquisition System further including means for assembling and transmitting to a Network Usage Information Service processor said preselected customer traffic data received by said Engineering and Administration Data Acquisition System; the Network Usage Information Service processor comprising:

means for receiving said transmitted preselected customer traffic data; and means for enabling the preselected customer traffic data associated with each preselected customer to be made available to that preselected customer.

\* \* \* \* \*

UNITED STATES PATENT AND TRADEMARK OFFICE
CERTIFICATE OF CORRECTION

PATENT NO. : 5,410,589
DATED : April 25, 1995
INVENTOR(S) : John P. Galligan

It is certified that error appears in the above-indentified patent and that said Letters Patent is hereby corrected as shown below:

Cover page, Item [57], line 5. After "adapted" insert -- to --.

Col. 2, line 55. After "of" insert -- the --.

Col. 2, line 56. After "tion" insert -- , --.

Col. 4, line 41. After "13," insert -- 14 --.

Col. 11, line 62. Before "enable" insert -- to --.

Signed and Sealed this

Twenty-fifth Day of July, 1995

BRUCE LEHMAN

Attest:

Attesting Officer

Commissioner of Patents and Trademarks